United States Patent [19]
Wenglar

[11] 3,779,511
[45] Dec. 18, 1973

[54] SANITARY BUTTERFLY VALVE

[75] Inventor: Frank G. Wenglar, Houston, Tex.

[73] Assignee: FMC Corporation, San Jose, Calif.

[22] Filed: Aug. 13, 1971

[21] Appl. No.: 171,651

[52] U.S. Cl. ................................ 251/306, 251/308
[51] Int. Cl. ........................................... F16k 1/226
[58] Field of Search .................... 251/214, 173, 298, 251/304–308

[56] References Cited
UNITED STATES PATENTS

| | | | |
|---|---|---|---|
| 3,030,066 | 4/1962 | Swain............................ | 251/306 X |
| 3,540,691 | 11/1970 | Snell.............................. | 251/306 X |
| 3,410,520 | 11/1968 | Mahoney....................... | 251/308 X |
| 2,858,098 | 10/1958 | Sanctuary..................... | 251/214 X |
| 3,241,806 | 3/1966 | Snell.............................. | 251/306 X |
| 3,598,365 | 8/1971 | Werra............................ | 251/307 |

FOREIGN PATENTS OR APPLICATIONS

| | | | |
|---|---|---|---|
| 937,203 | 9/1963 | Great Britain...................... | 251/306 |
| 221,683 | 11/1957 | Australia............................ | 251/306 |

*Primary Examiner*—Henry T. Klinksiek
*Assistant Examiner*—Robert J. Miller
*Attorney*—F. W. Anderson et al.

[57] ABSTRACT

A butterfly valve especially for use in pipeline systems where a very high level of cleanliness is mandatory, such as employed in the food, pharmaceutical and chemical industries. The valve comprises a disc-type closure element mounted on a valve stem that extends through the side of the valve body at a 45° angle, and a valve seat secured in place between a flange on one end of the valve body and an adjacent pipe flange, by a removable clamp. The stem is sealed to the valve body in a way that prevents entrapment of food or other material flowing through the valve, thus enhancing sanitary conditions in the valve during periods of continued or prolonged use. A simplified valve operating handle assembly, removably secured to the outer end of the valve stem, holds the disc and stem in place in the valve body and facilitates quick disassembly and reassembly of the valve for periodic cleaning or other servicing.

13 Claims, 6 Drawing Figures

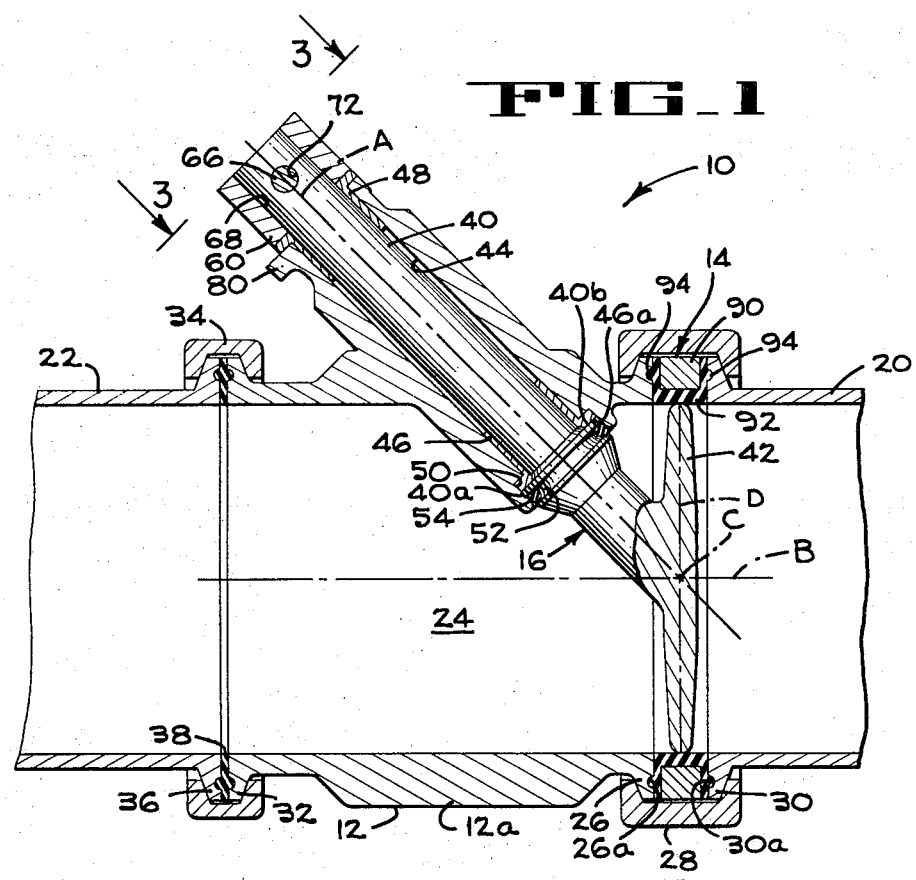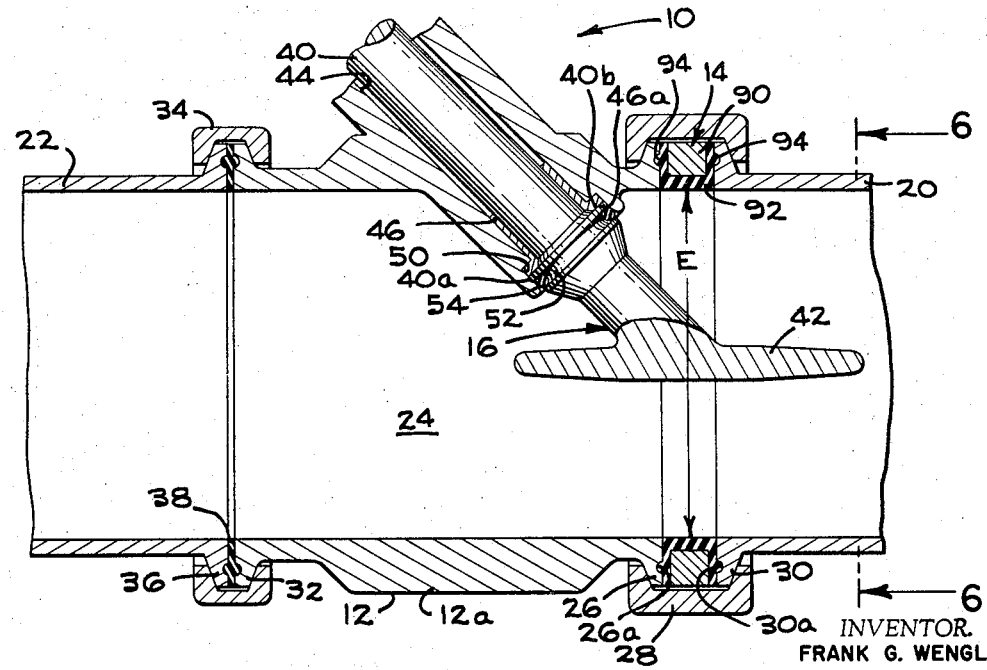

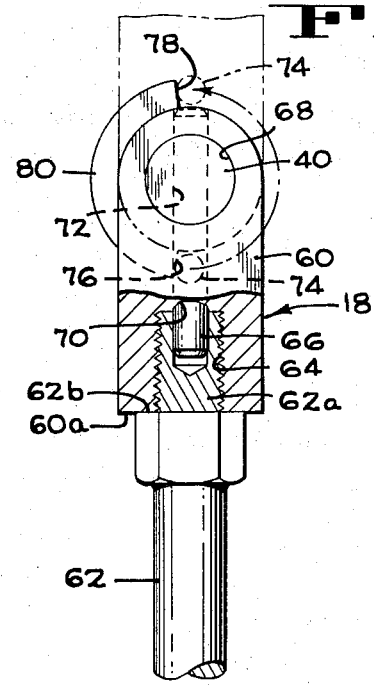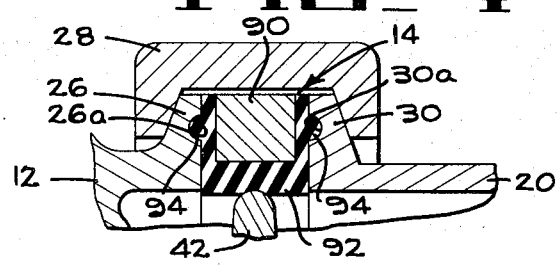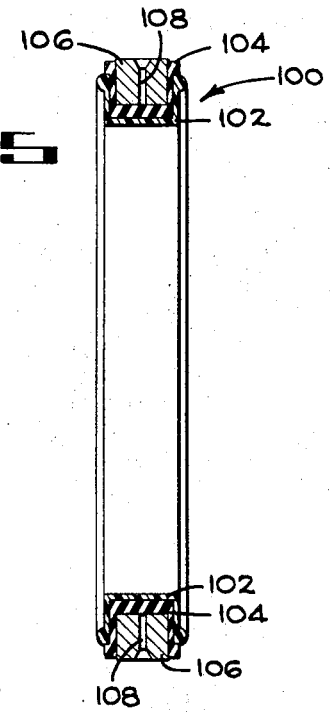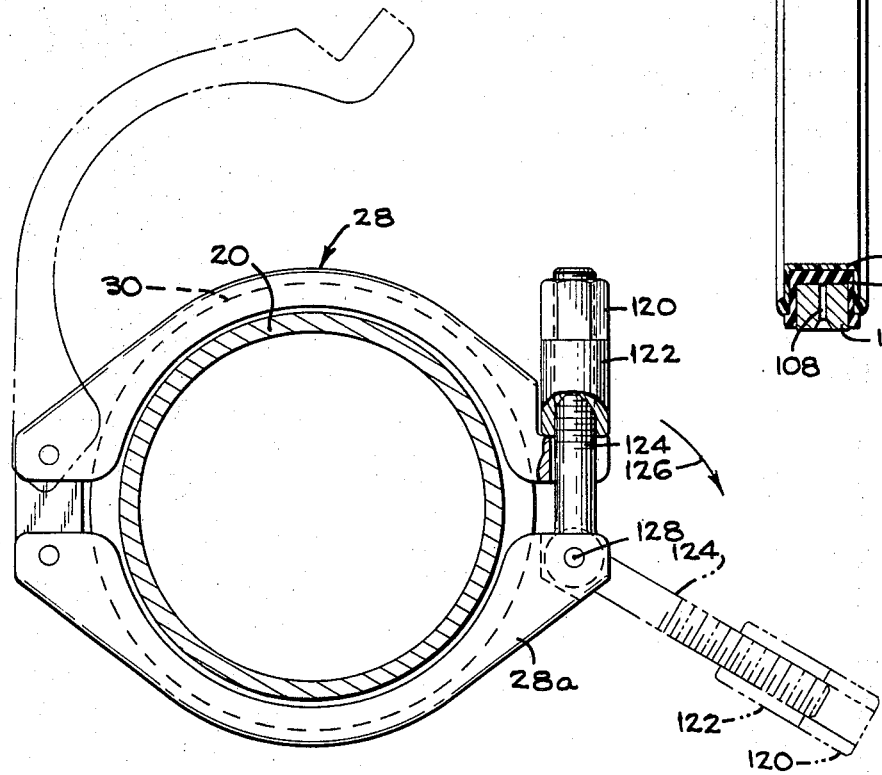

SANITARY BUTTERFLY VALVE

BACKGROUND OF THE INVENTION

The field of art to which this invention relates includes butterfly valves as classified in class 251, subclass 304-307 of the United States Patent classification system.

Industries involved in processing food, in the manufacture and packaging of pharmaceuticals, and handling chemicals and other materials where a high degree of purity is required, must maintain their pipe conduit systems in a very high state of cleanliness, and especially free from bacterial contamination. This type of contamination frequently results from an accumulation of material that is being conducted through the pipeline, in crevices, clearance cracks, or other areas in the valves and other system components, and when this occurs a thorough cleaning of the system is necessary.

Cleaning the pipes or other system conduits usually presents far less of a problem than cleaning the valves, for the valve components generally provide more opportunities for material accumulation to occur. In order to achieve absolutely sanitary conditions, the valves must be removed from the system and completely disassembled, thoroughly cleaned, and then reassembled and installed back in the system, all of which consumes valuable time and manpower. Although butterfly valves are generally less expensive than most other types of valves, and for this reason are preferred for use in sanitary service, the butterfly valves presently available all have one or more undesirable features, such as elaborate construction, tendency to collect material, lengthy and/or complex disassembly and reassembly procedures, etc., that greatly reduces their acceptance in this field.

SUMMARY OF THE INVENTION

This invention comprises a butterfly valve of highly simplified construction, with a unitary valve seat mounted externally of the valve body, a closure disc and stem assembly that is quickly and easily removed from and reinstalled in the valve body, and a detachable handle assembly that serves both as a means to retain the disc and stem assembly in place in the body and to rotate the stem and thus pivot the disc for opening and closing the valve. One end of the valve body is provided with an external radial flange around the flow passage for clamping the body to an opposing end flange of a pipe, and the unitary seat is positioned between these two flanges for maximum accessibility. The stem extends through one side of the valve body at an angle of generally 45° with respect to the flow passage axis, and a sealing system between the stem and the body is structured so that clearance cracks are eliminated and flow through the valve tends to wash the seal area, thus preventing accumulation of food or whatever material is being conducted through the valve. The handle assembly includes a coupling that fits over the external end of the stem, a shank element that is threaded into the coupling, and a central pin that is fixed to the shank element and extends into a transverse bore through the stem to secure the handle assembly non-rotatably to the stem. In one form of the invention, the other end of the valve body also is provided with an external radial flange around the flow passage to facilitate clamping that end to an opposing pipe flange, thereby simplifying connection and disconnection of the valve from the pipeline in which it is used.

Accordingly, it is one object of this invention to provide an inexpensive butterfly valve of relatively simple construction suitable fo sanitary service.

Another object of this invention is to provide a butterfly valve whose interior surfaces are substantially impervious and crevice free, to facilitate cleaning the valve with relative ease.

Yet another object of this invention is to provide a sanitary butterfly valve that can be removed from a pipeline, disassembled, thoroughly cleaned, reassembled, and reinstalled in the pipeline in a minimum of time and with maximum efficiency, thereby reducing pipeline shutdown time for valve servicing or replacement to a minimum.

BRIEF DESCRIPTION OF THE DRAWINGS

FIG. 1 is a central longitudinal section of the valve according to the present invention, showing the disc closure element in its closed position.

FIG. 2 is a view like FIG. 1, showing the disc in its fully opened position.

FIG. 3 is a fragmentary view taken in the direction of arrows 3—3 of FIG. 1, a portion being broken away to show the mechanism for connecting the handle to the valve stem.

FIG. 4 is a fragmentary section, on an enlarged scale, of the valve seat installed between the valve body and the opposing pipe flange, with the disc in its closed position.

FIG. 5 is a vertical section of a modified form of valve seat within the scope of the present invention.

FIG. 6 is a transverse section taken along the lines 6—6 of FIG. 2, showing one form of removable clamp for securing the valve to a flanged pipe or other suitably structured element.

DESCRIPTION OF THE PREFERRED EMBODIMENTS

With reference primarily to FIGS. 1-3, a butterfly valve 10 embodying the principles of the present invention comprises a valve body 12, a valve seat 14, a valve stem and disc assembly 16, and a handle assembly 18 (FIG. 3). In FIGS. 1 and 2 the valve 10 is shown installed between two pipes 20,22 of a sanitary pipe system, with the stem and disc assembly oriented in the closed position in FIG. 1, and rotated 180° therefrom into the open position in FIG. 2.

The valve body 12 is generally cylindrical in outside configuration with a somewhat thicker mid-section 12a, although it is to be understood that other external configurations are also within the scope of the invention. The body 12 has a cylindrical bore that constitutes a flow passage 24, and terminates in an external radial flange 26 at one end for securing the valve by means of a conventional wedge clamp 28 (FIG. 6) to a flange 30 at the end of the pipe 20. In this embodiment the other end of the valve body 12 also is provided with a flange 32 for securing it by means of another wedge clamp 34 to a flange 36 of the pipe 22. A seal ring 38, widely used in sanitary installations, is positioned between the flanges 32,36 for sealing the body 12 to the pipe 22 in a fluid tight manner.

The stem and disc assembly 16 comprises a cylindrical valve stem 40 and a cylindrical disc 42, the disc being cast integrally with the stem or formed separately and then secured to the stem by furnace brazing or other suitable procedure. The valve body 12 has a lateral bore 44 through which the stem 40 extends, so that when the valve is assembled the centerline A (FIG. 1) of the stem and this lateral bore intersects the centerline B of the valve's flow passage 24 at a point C in the center of the disc 42. The centerlines A and B define an angle of generally 45°, and likewise the centerline A defines an angle of 45° with the disc's radial centerline D. Accordingly, in order to fully open the valve from its closed condition (FIG. 1) the stem must be rotated 180°.

The stem 40 is supported in the bore 44 by inner and outer bushings 46,48, and has a raised annular portion 40a that fits into a counterbore 50 at the inner end of the bore 44. When the stem is properly positioned in the bore 44, the stem's shoulder 40b contacts the opposed surface of an annular radial flange 46a on the end of the bushing 46.

One of the outstanding features of the present invention is the unique manner in which the stem 40 is sealed to the body 12. The stem's raised annular portion 40a is provided with an annular groove 52 at a position partially within the counterbore 50 and partially exposed to the valve's flow passage 24. Thus, when an annular seal element 54, such as an "O" ring of rubber, Teflon, or other suitable seal material, is positioned in the groove 52, a significant portion of this seal element is exposed to fluid flowing through the valve, thereby maintaining circulation and preventing accumulation of material in this area that, in other valves, normally contains stagnant material in minute clearance cracks. Of course, the portion of the seal element 54 not so exposed functions to maintain fluid tight integrity between the stem 40 and the counterbore 50 at every point where it is in contact with them.

The handle assembly 18 constitutes yet another important and unique feature of this invention. As shown in FIGS. 1 and 3, this assembly comprises a coupling 60, a shank element 62 that is threaded into a first longitudinal bore 64 in the coupling 60, and a lock pin 66 that is press fitted, brazed, or otherwise suitably fixed coaxially to the shank element's threaded portion 62a. The coupling 60 has a transverse bore 68 that accepts the valve stem 40, and a second longitudinal bore 70, coaxial with the bore 64 and bisecting the bore 68, through which the pin 66 extends. When the shank 62 is threaded fully into the coupling 60, its shoulder 62b is seated against the coupling's end surface 60a, and the pin 66 extends through the bore 70.

Accordingly, when the coupling 60 is placed on the valve stem 40 so that the bore 70 is in registration with a transverse bore 72 in the outer end portion of the stem (FIG. 3), threading the shank 62 fully into the coupling 60 will cause the pin 66 to extend through the bore 72, thereby quickly and easily securing the handle assembly non-rotatably onto the stem. Even more quickly and easily the handle assembly can be removed merely by unthreading the shank 62 from the coupling 60 and then lifting the coupling off the stem, thereby freeing the stem and disc assembly for withdrawal as a unit from the valve body 12 Thus, this valve can be rapidly assembled and disassembled without any tools, and with no need for a special degree of mechanical competence.

The coupling 60 is further provided with a stop pin 74 (FIG. 3) that limits rotation of the handle assembly and the stem 40 between shoulders 76,78 formed by the ends of a semi-circular radial flange 80 extending outwardly from the valve body 12 at the outer end of the lateral bore 44. This system functions to locate the disc 42 in the open or closed position.

Still another important feature of the present invention involves the unitary seat 14 and its location relative to the valve body 12. This seat comprises a metal, plastic, or other rigid backup ring 90 bonded to a liner 92 of rubber or other suitable resilient material. The liner 92 is provided on each of its end faces with annular protrusions or beads 94 that fit into mating grooves 26a,30a of the adjacent flanges 26,30. These beads not only enhance the sealing effectiveness of the seat between these flanges, but assist in aligning the bore of the seat with that of the flow passage 24. The inside diameter E (FIG. 2) of the liner 92 is slightly less than the diameter of the valve disc 42, so when the valve is closed the disc and liner form an interference fit that provides a fluid-tight seal. This is clearly seen in FIG. 4, which shows the relationship between the closed disc and the seat in an enlarged scale.

Accordingly, in the valve of this invention the seat 14 is quickly and simply removed merely by loosening the wedge clamp's nut 120 and spacer 122 (FIG. 6) on the bolt 124, pivoting the bolt outwardly in the direction of the arrow 126 about its pivotal connection at 128 to the clamp's first section 28a, opening the clamp, and sliding the seat out from between the flanges 26,30. As is readily apparent, installation of a new seat involves merely a reversal of the foregoing procedure. It should be noted at this point that both procedures can be accomplished without removing the valve from the pipeline, if this is desirable. Consequently, maximum efficiency is achieved in seat servicing and replacement when this valve is employed.

An alternate form of seat particularly advantageous for use in corrosive conditions is illustrated in FIG. 5. This seat 100 comprises corrosion resistant liner 102, such as of Teflon, bonded to a rubber or other resilient backing 104 that in turn is bonded to a rigid backup ring 106. The liner 102 is held under constant compression between the outer periphery of the disc 42 and the flanges 26,30 by the resilient backing 104, and the ring 106 provides support to insure a permanent seal against leakage. The ring 106 is provided with holes 108 for injecting resilient backing material between it and the liner 102 in the process of moulding and bonding the components of this seat into a unit.

Although the foregoing version of the invention employs a flanged connection between the valve body 12 and the pipe 22, it should be understood that other types of connections, such as threaded, can be used at this location if desired.

Although the best mode contemplated for carrying out the present invention has been herein shown and described, it will be apparent that modification and variation may be made without departing from what is regarded to be the subject matter of the invention.

What is claimed is:
1. A butterfly valve comprising
   a tubular valve body defining a flow passage therethrough and including a terminal end defining a substantially radial face, said valve body having a single lateral bore therethrough extending obliquely with respect to said flow passage and toward said end face, an annular valve seat coaxial with said flow passage disposed entirely axially outwardly of said valve body, said valve seat including a substantially radial face portion positioned in abutting contact with said body terminal end face, a valve stem rotatable mounted within said lateral bore, said valve stem carrying a valve disc obliquely disposed thereon and providing the sole support therefor, said valve disc extending axially entirely beyond said valve body when the disc is in its closed position to seat entirely within and peripherally against said annular valve seat, and means for rotating said valve stem thereby to turn said valve disc between its closed position externally of said valve body and its open position disposed partially within said valve body.

2. A butterfly valve according to claim 1, including annular seal means circumscribing said stem and providing a fluid barrier between said stem and said valve body, said annular seal means being partially exposed to material flow through said flow passage to minimize accumulation of said material in said valve.

3. A butterfly valve according to claim 2 wherein said seal means comprises a resilient seal ring positioned in an external annular groove on said valve stem at the inner end of said lateral bore, with part of said ring located within said bore to establish a fluid-tight seal between said stem and said bore.

4. A butterfly valve according to claim 3 wherein the valve stem has a raised annular portion with an annular groove for retaining said seal ring, and wherein the inner end of said lateral bore is counterbored to receive said stem's raised portion and said seal ring.

5. A butterfly valve according to claim 4 including an annular bushing in said lateral bore with a radial flange extending into said counterbore, and an annular shoulder on said stem's raised portion that fits against said bushing flange when said valve is assembled.

6. A butterfly valve according to claim 1 wherein said valve seat comprises an annular rigid backup ring and a resilient liner bonded thereto, said liner extending over the inner axial surface and the radial end surfaces of said ring, said liner having at least one annular bead on at least one end surface for enhancing the integrity of the seal between said seat and an adjacent flow conducting element.

7. A butterfly valve according to claim 6 wherein said valve seat includes a corrosion-resistant covering over the portion of said liner exposed to material conducted through the valve.

8. A butterfly valve according to claim 1 wherein said terminal end of said valve body includes a radial annular flange extending outwardly from said flow passage, and wherein said valve seat is adapted to be secured between said valve body's flange and said pipe flange by a wedge clamp.

9. A butterfly valve according to claim 8 wherein the other end of said valve body includes a radial annular flange for securing said valve body to an adjacent pipe flange.

10. a butterfly valve, comprising:

a valve body with opposite ends, a flow passage extending between said ends, and a lateral bore communicating with said flow passage, a valve seat circumscribing said flow passage and positioned against the valve body adjacent one of said ends, a valve disc fitting within and seating against said valve seat when the disc is in its closed position, a valve stem extending through said lateral bore and secured to said valve disc, and means for rotating said valve stem to move said valve disc between open and closed positions, said means comprising a handle assembly removably secured non-rotatably to the outer end of said valve stem, said handle assembly comprising a coupling having a transverse bore for accepting said valve stem and a longitudinal bore intersecting said transverse bore, a shank having a portion insertable into said coupling's longitudinal bore, and a lock pin fixed to said shank and insertable through said longitudinal bore into said coupling's transverse bore.

11. A butterfly valve according to claim 10 wherein said valve stem has a transverse bore that registers with said coupling longitudinal bore when said coupling is properly installed on said stem, and wherein said lock pin extends into said transverse bore of said stem to secure the handle assembly non-rotatbly to the stem.

12. A butterfly valve according to claim 10 wherein said portion of said shank is threaded into the coupling's longitudinal bore.

13. A butterfly valve according to claim 10 wherein said coupling includes a stop that cooperates with said valve body to limit the extent of rotation of said valve stem to a predetermined range.

\* \* \* \* \*